Figure 1:
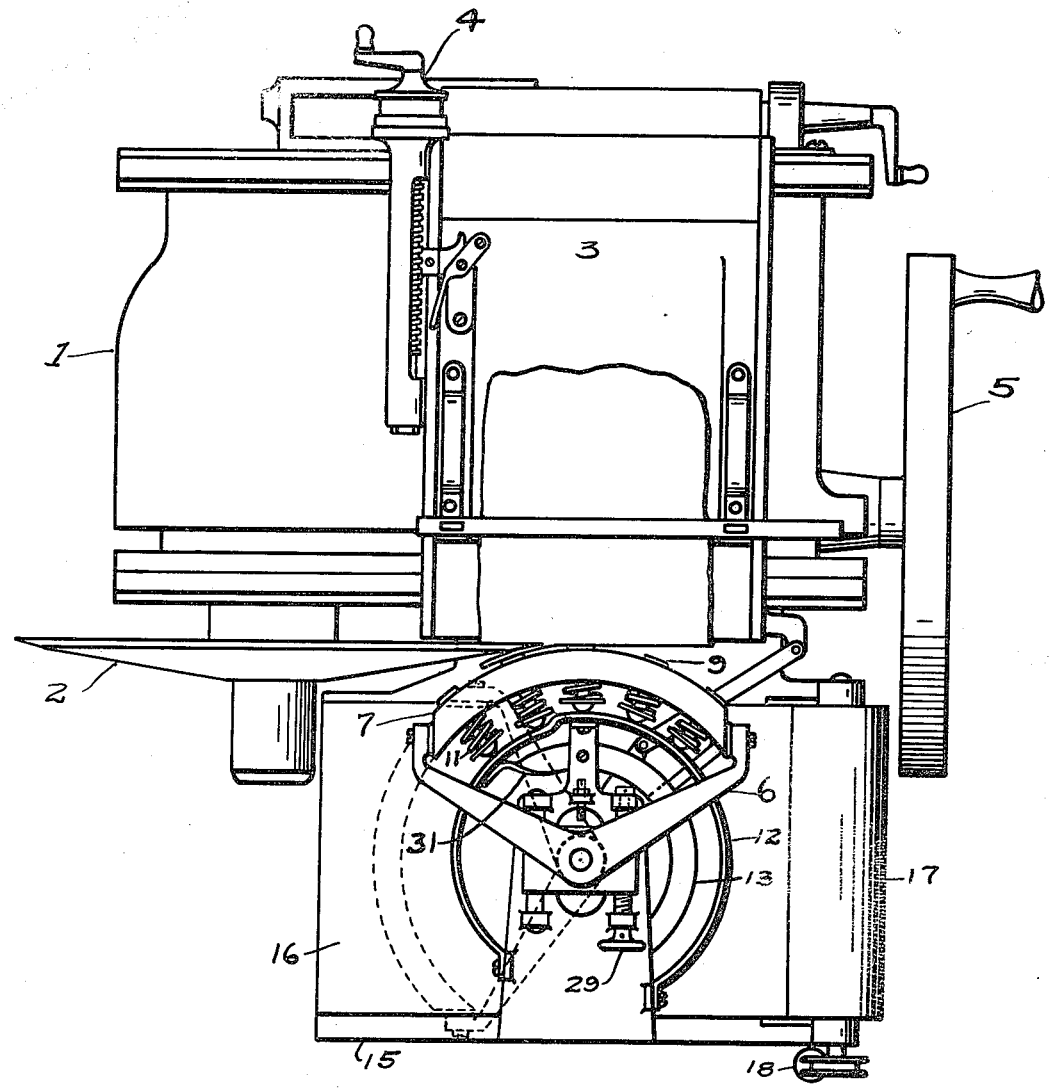

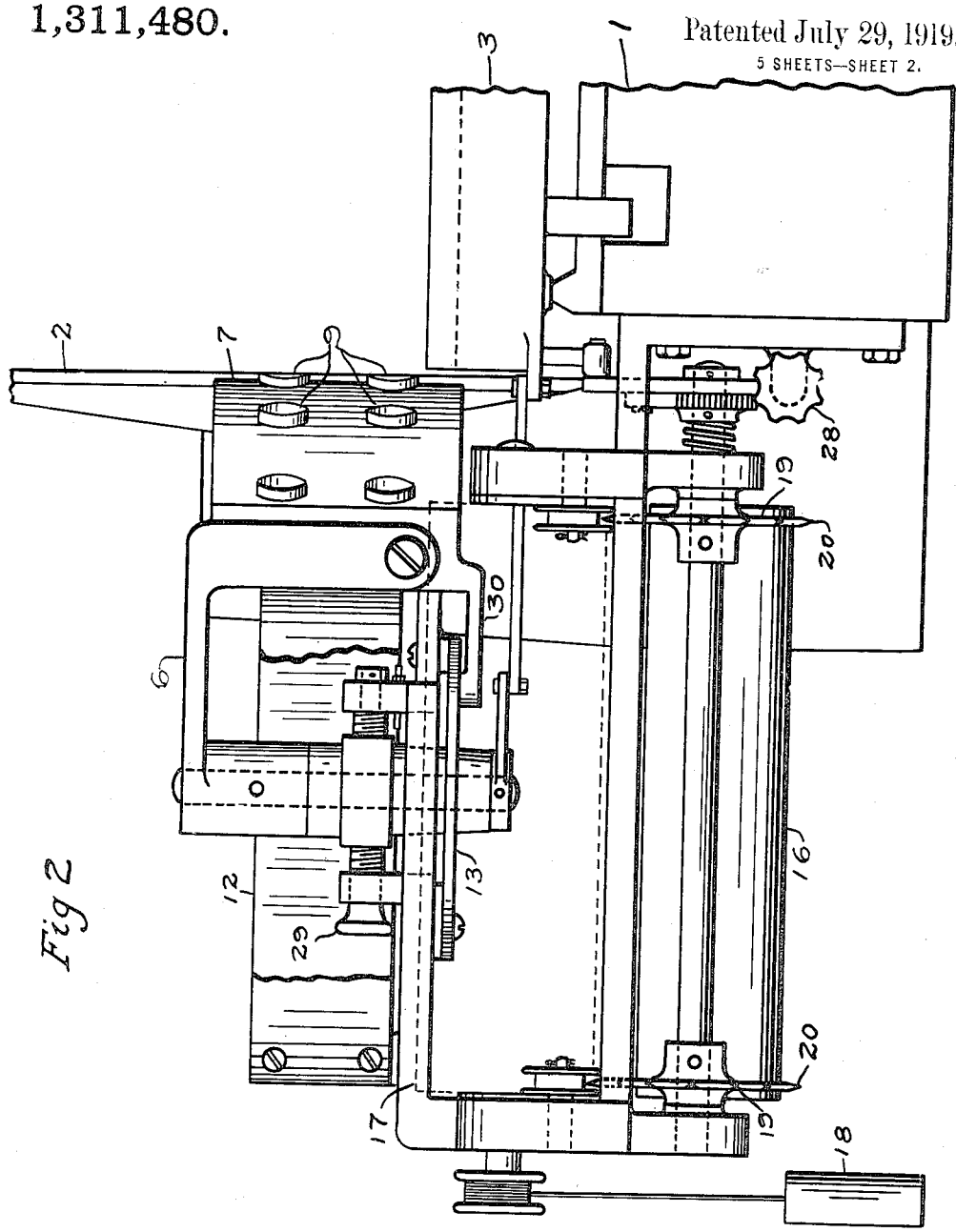

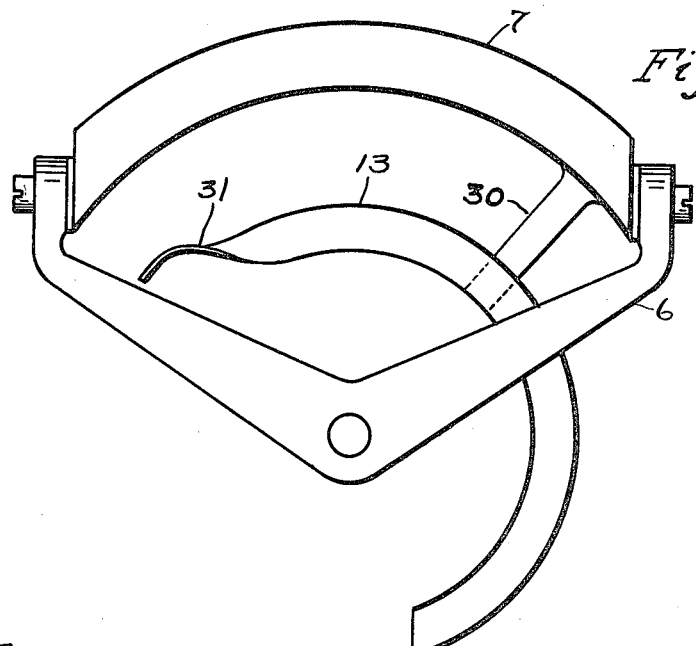
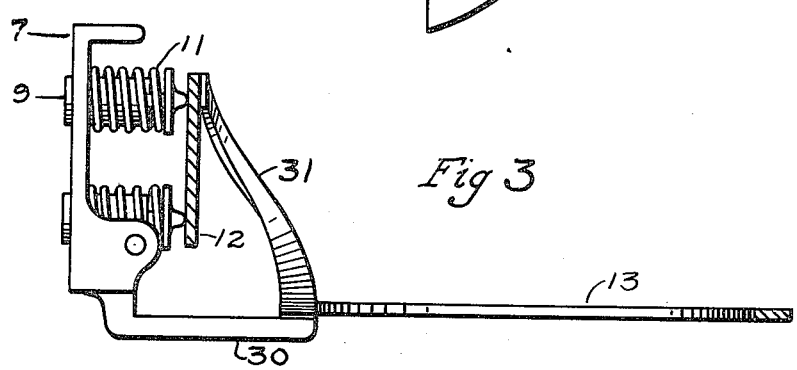
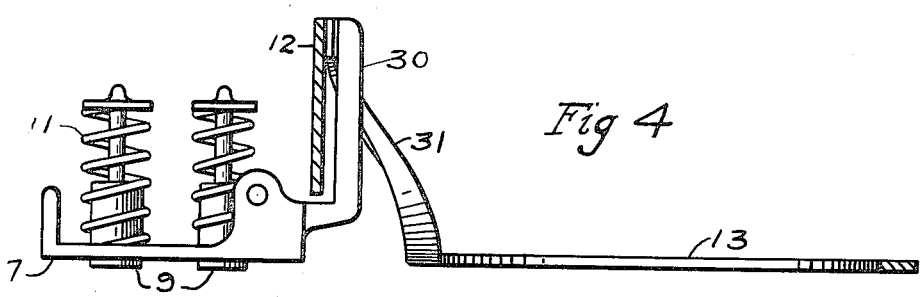

W. B. WOLFF AND E. K. HOOD.
SLICE STACKING DEVICE FOR SLICING MACHINES.
APPLICATION FILED MAY 2, 1919.
1,311,480.
Patented July 29, 1919.
5 SHEETS—SHEET 4.
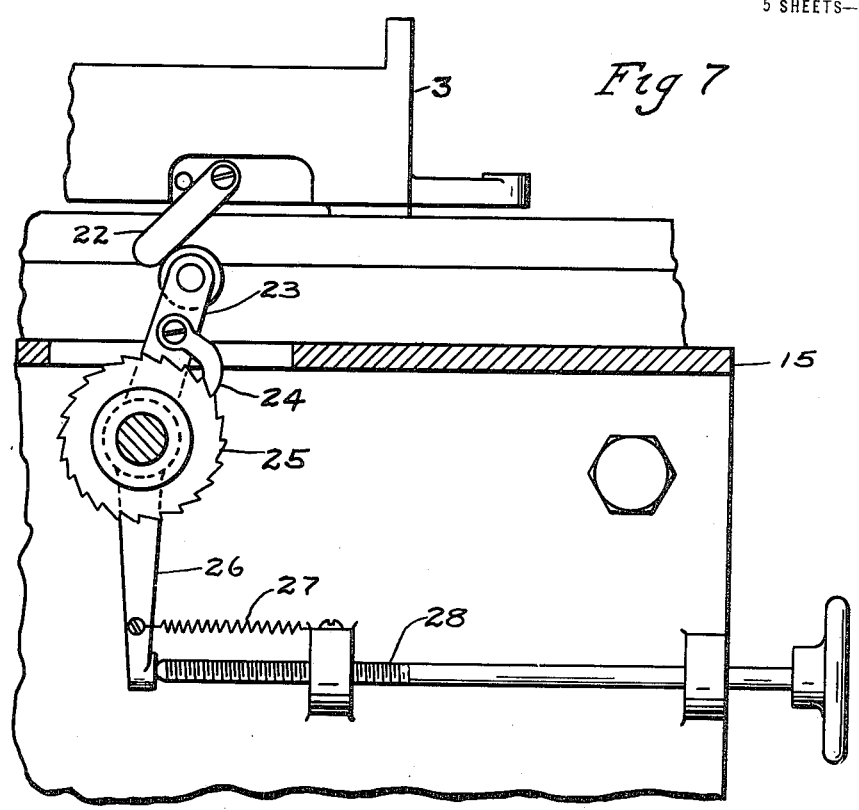
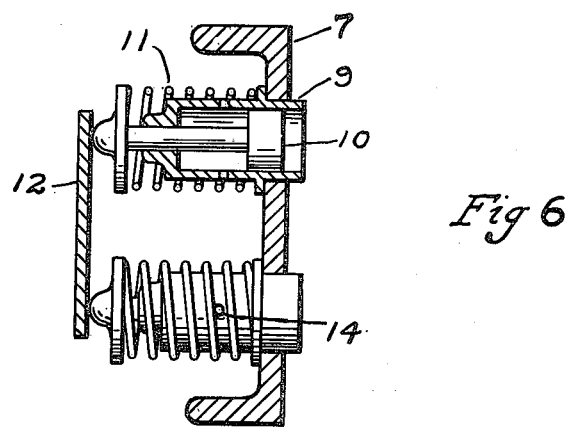

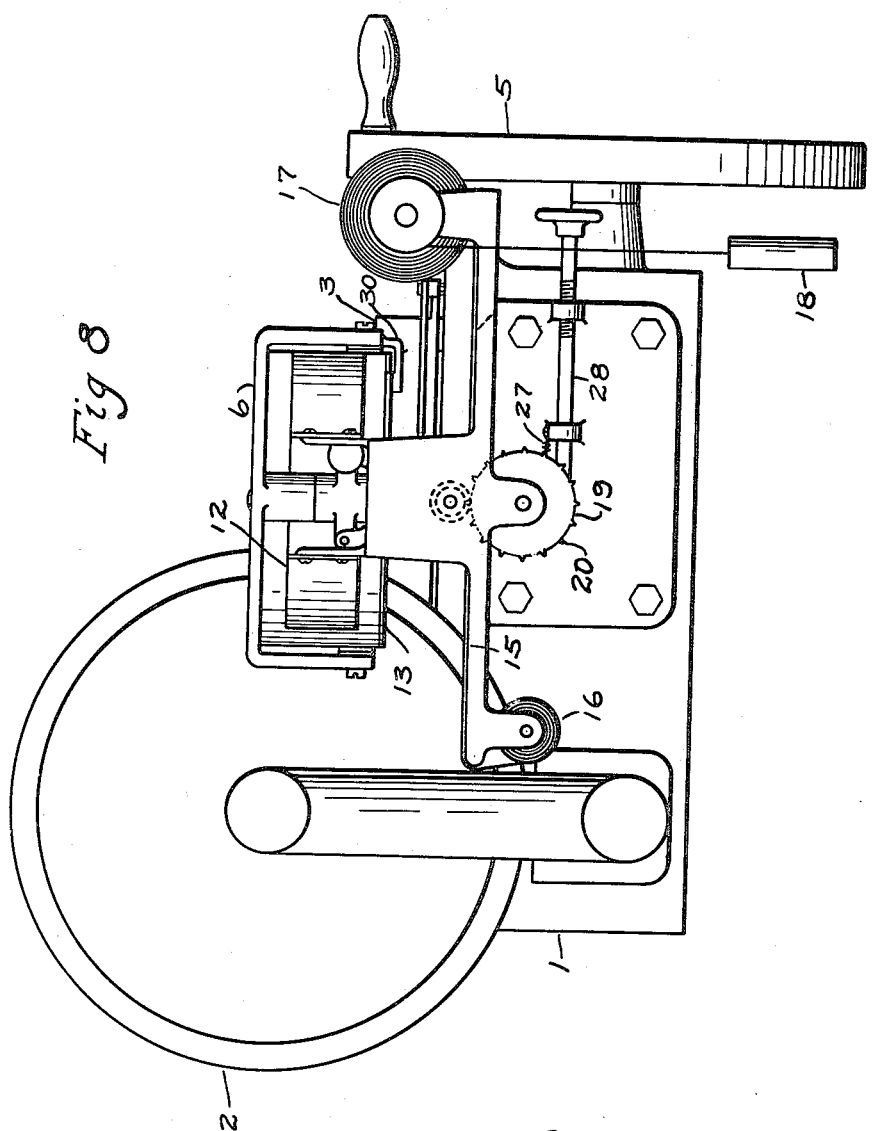

UNITED STATES PATENT OFFICE.

WALLACE B. WOLFF, OF CHICAGO, ILLINOIS, AND ERNEST K. HOOD, OF INDIANAPOLIS, INDIANA, ASSIGNORS TO AMERICAN SLICING MACHINE CO., OF CHICAGO, ILLINOIS, A CORPORATON OF NEW YORK.

SLICE-STACKING DEVICE FOR SLICING-MACHINES.

1,311,480.   Specification of Letters Patent.   Patented July 29, 1919.

Application filed May 2, 1919. Serial No. 294,287.

*To all whom it may concern:*

Be it known that we, WALLACE B. WOLFF, a resident of Chicago, in the county of Cook and State of Illinois, and ERNEST K. HOOD, a resident of Indianapolis, in the county of Marion and State of Indiana, have invented certain new and useful Improvements in Slice-Stacking Devices for Slicing-Machines, of which the following is a specification.

Our invention relates more particularly to a device for stacking bacon, but it can be used for any other material which can be sliced on an ordinary slicing machine.

The object of our invention is to provide means for holding, discharging, and stacking slices which will not injure them, neither by perforation nor breaking, and the invention consists in the combination and arrangement of parts hereinafter described and claimed.

Heretofore all devices of this character have taken slices, as they are cut, by means of impaling devices and this injures the slices to such an extent that the customer objects to the perforations therein. In our device, the slices are held pneumatically as they are cut and there is no tendency to distort, perforate, or injure the slices.

Our invention is shown in the accompanying drawings of which Figure 1 is a plan showing the device in combination with the standard slicing machine.

Fig. 2 is an elevation.

Fig. 3, a detail of the plunger frame in one position.

Fig. 4, a detail of the plunger frame in another position.

Fig. 5, a diagrammatic plan of the plunger frame cam.

Fig. 6, a cross section showing the construction of the plungers and cylinders.

Fig. 7, a detail of the table feeding device.

Fig. 8, an elevation of the slice receiving table and its devices.

The numeral 1 represents the ordinary standard slicing machine equipped with a rotary knife 2, reciprocating carriage 3, and an adjustable feeding device 4. This machine is operated in the usual manner by hand wheel 5.

Mounted adjacent the cutting edge of knife 2 is a reciprocating frame 6 which carries a plunger face plate 7. This face plate is designed so that a series of open end cylinders mounted therein will just contact with the meat or other substance as it is to be sliced, and the said frame 6 is oscillated in synchronism with the meat as it is cut.

Plunger face plate 7 carries a series of open end cylinders 9; each provided with a plunger 10 operated in one direction by a spring 11 and in the other direction by a cam surface 12. The initial operation of this part of the device is as follows:—

The meat to be cut is placed on the carriage of the slicing machine and the feed adjusting mechanism set to the desired thickness. The machine is then operated and the open end of the cylinders #9 contact slightly with the end of the meat and as the carriage is moved forward and the slice is cut by the knife, the frame 6 is moved.

The plungers 10 are allowed to recede in their cylinders and produce a partial vacuum therein, thus holding the slice to the end of the cylinders. A sufficient number of these cylinders are placed in the face plate 7 to assure the taking hold of slices which are irregular in shape.

The cam surface 12 is so designed that as the frame 6 is oscillated or advanced the plungers gradually move back and maintain the partial vacuum they have produced until the frame is carried around to a position approximately at right angles to its starting position. At this point the face plate 7 is turned from a vertical to a horizontal position by means of a flat turned cam 13, and at the same time the cam 12 is backed off so as to allow the springs 11 to pull the plungers deeper into the cylinder 9 and pass a ventport 14 which breaks the vacuum in the cylinders and allows the slice to drop on the table.

This device is especially designed for handling sliced bacon, and for commercial purposes it is advisable to lay the bacon progressively on a strip of paper so that the fat and lean parts will show in good shape and it is usually the practice to cover about ½ or ⅓ of the preceding slices with the next slice. It is the practice now to lay these slices by hand on sheets of paper and we have provided means working concurrently with the sliced stacker so that this same object can be accomplished.

Table 15 has at one end, a roll of light or oiled paper 16, which is carried over the top of the table and around a drum 17.

This drum 17 is provided with a weight tension device 18.

The paper is made about an inch wider than the bacon strips are long and each edge of the paper is carried over a feeding wheel 19, provided with pins or extensions 20 adapted to perforate the paper so that these feeding drums will control the movement thereof. To feed this paper forward, we then provide a latch or trigger 22 mounted on the carriage of the slicing machine. Said latch is adapted to strike a lever 23 provided with a pawl 24 which operates a ratchet 25 mounted on a shaft carrying drums 19.

To regulate the amount that latch 22 will rotate ratchet 25, we provide an extension 26 on lever 23, which is normally held in one direction by means of a spring 27 and its initial position is controlled by means of a screw 28.

The operation of the feeding mechanism for the paper is as follows:—The carriage of the slicing machine is moved forward in the cutting direction and latch 22 rides over the end of lever 23 without operating it. Then on the return stroke or backward movement of the slicing machine carriage, the latch 22 strikes the end of lever 23, and causes this lever to rotate ratchet 25 which in turn operates the drums 19.

The pins 20 take hold of the paper, perforate it, and moves it forward and the tension weight 18 takes up the slack in the paper.

It is self-evident that the open end of the cylinders 9 must be set at the proper distance from the cutting edge of the knife to accommodate the thickness of the slice which is being cut. For this purpose, we provide an adjustment 29 which carries the oscillating frame 6 so that this frame can be set at the proper place to suit the thickness of the slice which is being cut.

The operation of the entire device is as follows:—The meat or other substance to be cut is clamped in the carriage of the slicing machine. The feed mechanism 4 is then set for the desired thickness of the slice. The adjusting mechanism 29 is then set at this slice thickness. The hand wheel 5 is then operated and the meat is brought in contact with the knife. The slice is cut and at the same time the frame 6 advances. The plungers 10 are moved in their cylinders by means of springs 11. A partial vacuum is produced in the cylinders and the slice is held against the end of the cylinders. As the carriage proceeds, the frame 6 turns until the slice is entirely detached from the piece of meat and is held on the cylinders 9. At the end of the forward stroke of the carriage, the frame 6 is approximately at right angles to its starting position. Then at this point, the projection 30 on face plate 7 rides around the curved surface 31 on cam 13 and the face plate 7 is turned or dropped from a vertical position to a horizontal position. At this same time, plungers 10 leave the cam 12 and the springs 11 allow the plungers to pass port 14 which breaks the vacuum and the slice is dropped onto the sheet of paper. The slicing machine carriage then starts back to its initial position. Trigger 22 operates lever 23 which in turn through the above described mechanism advances paper 16 the desired amount.

The oscillated frame 6 returns to its initial position.

The feed mechanism 4 on the slicing machine, operates; the meat is advanced for another slice, and the same conditions as above described are then gone through with.

All of these movements are set in synchronism and the next slice is placed on the first slice covering the predetermined amount of the same.

It may be desired to drive the plungers forward and slightly out of their cylinders in order to discharge greasy or gummy meat. This can be readily accomplished by forming cam surface 12 so that when drum 7 turns down to the horizontal position, the plungers are forced forward in their cylinders and out of them a short distance thus pushing the meat or slice entirely off the cylinders.

The bacon or other material thus sliced is wound up on the paper into drum form as shown at 17; thus covering the entire slice with paper so that it can be put in the ice box and kept in that condition. When a customer desires to purchase, the meat is taken from box, the desired amount unrolled and cut off. This makes it possible to keep the sliced meat moist and in proper sanitary condition.

While we have shown and described a device adapted to bacon, we do not want to limit it to this. Our prime object is to provide a mechanism which will take the slice, hold it and discharge it without perforating it and without injuring the slice.

We claim as our invention:—

1. In a slicing machine the combination of a rotating knife; a reciprocating carriage; and a pneumatic receiver adapted to hold the slice as it is produced substantially as and for the purpose set forth.

2. In a slicing machine the combination of a rotating knife; a reciprocating carriage; and a reciprocating pneumatic receiver adapted to hold the slice as it is produced, substantially as and for the purpose set forth.

3. In a slicing machine the combination of a rotating knife; a reciprocating carriage; a reciprocating pneumatic receiver adapted to hold the slice as it is produced; and means for discharging the slice from said receiver substantially as and for the purpose set forth.

4. In a slicing machine the combination of a rotating knife; a reciprocating carriage; a reciprocating receiver; cylinders carried by said receiver adapted to contact the material to be sliced slightly in advance of the point at which the slice is severed; and means for producing a partial vacuum in said cylinders; substantially as and for the purpose set forth.

5. In a slicing machine the combination of a rotating knife; a reciprocating carriage; a reciprocating receiver; cylinders carried by said receiver adapted to contact the material to be sliced slightly in advance of the point at which the slice is severed; and means for producing a partial vacuum in said cylinders; and means for breaking said vacuum to discharge the slice substantially as and for the purpose set forth.

6. The combination with a slicing machine of a rotating knife; a reciprocating carriage, an oscillating frame, a plurality of open end cylinders carried thereby, a plurality of plungers therein, springs actuating said plungers in one direction and means for actuating the plungers in the other direction, substantially as and for the purpose set forth.

7. The combination with a slicing machine of a rotating knife; a reciprocating carriage, an oscillating frame, a plurality of open end cylinders carried thereby, a plurality of plungers therein, springs actuating said plungers in one direction and means for actuating the plungers in the other direction, a vent hole in each cylinder located so that the plunger will pass it at a predetermined time, and thus break the vacuum, substantially as and for the purpose set forth.

8. The combination with a slicing machine of a rotating knife; a reciprocating carriage, an oscillating frame, a plurality of open end cylinders thereon, a plurality of plungers in said cylinders, springs actuating said plungers in one direction, a cam actuating said plungers in the opposite direction, a means for turning said cylinders from one plane into another plane, substantially as and for the purpose set forth.

9. The combination with a slicing machine of a rotating knife; a reciprocating carriage, an oscillating frame, a plurality of open end cylinders carried thereby, spring actuated plungers adapted to produce a partial vacuum in said cylinders, a means for turning said cylinders from one plane into another, substantially as and for the purpose set forth.

10. In a slicing machine, the combination of a rotating knife; a reciprocating carriage, an oscillating frame carrying open cylinders adjacent the slice as it is cut from the piece, means for producing a partial vacuum in said cylinders and thus holding the slice, a means for breaking partial vacuum for discharging said slice, substantially as and for the purpose set forth.

11. In a slicing machine, a slice receiving table consisting of paper or other material, feeding drums provided with prongs adapted to perforate the edges of said paper, a means for intermittently operating said perforating means, substantially as and for the purpose set forth.

WALLACE B. WOLFF.
ERNEST K. HOOD.

Witnesses:
BESS WIARS,
JOHN BROWN.

Copies of this patent may be obtained for five cents each, by addressing the "Commissioner of Patents, Washington, D. C."